(No Model.) 2 Sheets—Sheet 1.
J. L. BOARD.
CONVEYING APPARATUS.
No. 506,357. Patented Oct. 10, 1893.
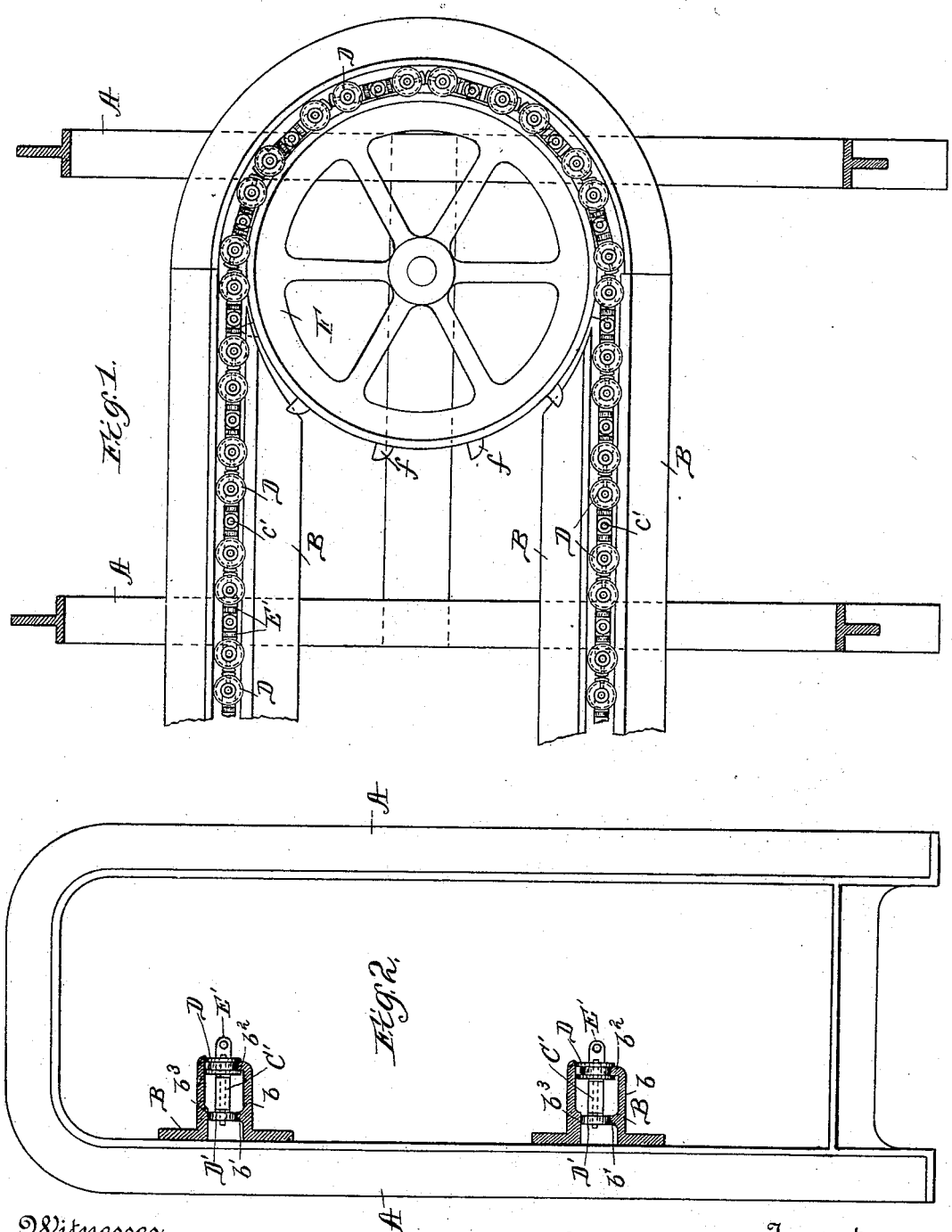
Witnesses
Inventor
James L. Board
By his Attorney (No Model.)

J. L. BOARD.
CONVEYING APPARATUS.

No. 506,357.   Patented Oct. 10, 1893.

UNITED STATES PATENT OFFICE.

JAMES L. BOARD, OF CHICAGO, ILLINOIS.

CONVEYING APPARATUS.

SPECIFICATION forming part of Letters Patent No. 506,357, dated October 10, 1893.

Application filed December 7, 1892. Serial No. 454,327. (No model.)

*To all whom it may concern:*

Be it known that I, JAMES L. BOARD, a citizen of the United States, residing at Chicago, in the county of Cook, State of Illinois, have invented a certain new and useful Improvement in Conveying Apparatus; and I declare the following to be a full, clear, and exact description of the same, such as will enable others skilled in the art to which it pertains to make and use the same, reference being had to the accompanying drawings, which form a part of this specification.

My invention relates to that class of can soldering machines in which the cans are grasped by suitable mechanism carried along, and one end treated to the solder bath, and then the end reversed, and the opposite end treated to the solder bath. Heretofore in this class of machines an endless chain has been provided, and at regular intervals on this chain the clamping mechanism for holding the can has been placed.

The object of my invention is to dispense with this endless chain and provide a series of carriages or carriers running on an endless track and driven by suitable power.

The invention consists in a combination of devices and appliances hereinafter described and claimed.

Figure 3:
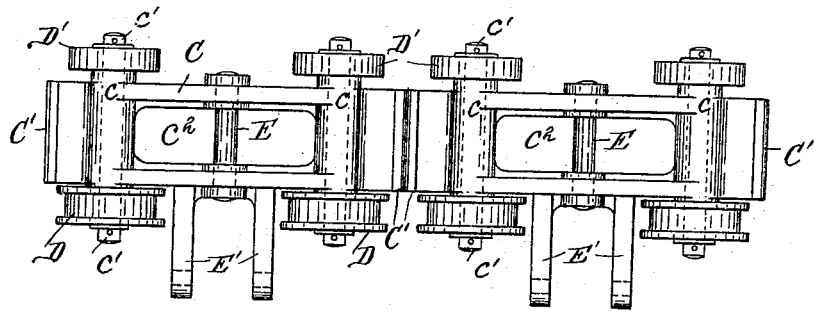
Figure 4:
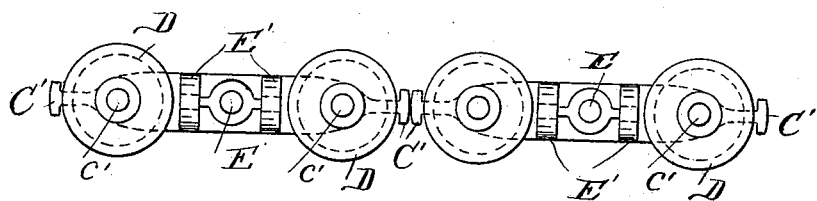
Figure 5:
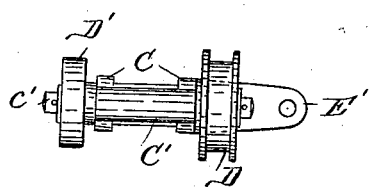

In the drawings: Figure 1. is a side elevation of a portion of my mechanism; Fig. 2. an end elevation showing the track in section; Fig. 3. a plan view of the carrier on an enlarged scale; Fig. 4. a side elevation of the same; Fig. 5. an end view.

In carrying out the invention A represents a suitable frame work shown in Figs. 1. and 2. to which the endless track B is engaged. This track is composed of a lower portion $b$, having the ridges $b'$—$b^2$ and the upper section $b^3$. The car or carrier runs between the two track sections as hereinafter described.

C is the frame work of the carrier provided with bearings $c$ at each end through which the axle $c'$ is extended on which the wheels, or rollers D—D' are journaled. At each end of the frame beyond the bearings $c$ are what may be termed the "bumpers" C'. Extending out from the frame C and pivoted thereto by the bolt E is the frame E', and to this frame E' the can clamping mechanism is engaged, but as this forms no part of my invention, I have not shown it. It will be observed that the wheels D' have flat peripheries, while the peripheries of the wheels D are channeled.
Now as will be seen by reference to Fig. 2. the wheels D' travel on the ridge $b'$, while the wheels D travel on the ridge $b^2$, both sets of wheels being held down to the track by the portion $b^3$ of the track. At one end of the loop formed by the endless track is what may be termed a sprocket wheel F. The projections or sprockets $f$ on the periphery of the wheel being so spaced that they will enter the opening $c^2$ in the frame of the carriage. It will thus be seen that by filling the entire track with carriages and allowing the bumpers of each carriage to come in contact with those next adjacent, when one carriage is pushed along the track the entire line will be moved. Thus by revolving the sprocket wheel F, those carriages that are engaged by the sprockets, that is, those which are at that end of the frame, will be moved along and will push the one next adjacent, and so on until the entire line is moved. Should one of these carriages get out of order, it is a very simple matter to remove it and place in position another without any detaching of links, as has heretofore been the case where an endless chain was used to carry the cans. This construction is therefore much simpler and fully as effective as the constructions heretofore in use.

While I have herein described the invention as applicable to a can soldering machine, yet it is obvious that the track might be arranged on a horizontal plane and used for any work, or process where it is desirable to have an endless line of carriers.

What I claim is—

1. The combination with an endless track of a series of carriers traveling on said track and substantially filling the space on said track whereby one carrier is closely adjacent to, or in contact with the carrier next adjacent but entirely disconnected from the latter, and means for engaging one or more of the carriers to move it through a prescribed space, thereby moving all the carriers in advance by pushing them, substantially as described.

2. The combination with an endless track of a series of carriers traveling on said track and substantially filling the space thereon, said carriers entirely disconnected from each other and a sprocket wheel located at one point on said track to engage one or more of the carriers and move it, thereby pushing the rest of the train, substantially as described.

3. The combination with an endless track formed of two sections one above the other of a series of carriers traveling upon said track and capable only of longitudinal motion, each of said carriers being adjacent to but entirely disconnected from the carriers next adjacent and means for pushing the line of carriers around the track, substantially as described.

In testimony whereof I sign this specification in the presence of two witnesses.

JAMES L. BOARD.

Witnesses:
W. H. CHAMBERLIN,
J. RAYHILL.